Figure 2:
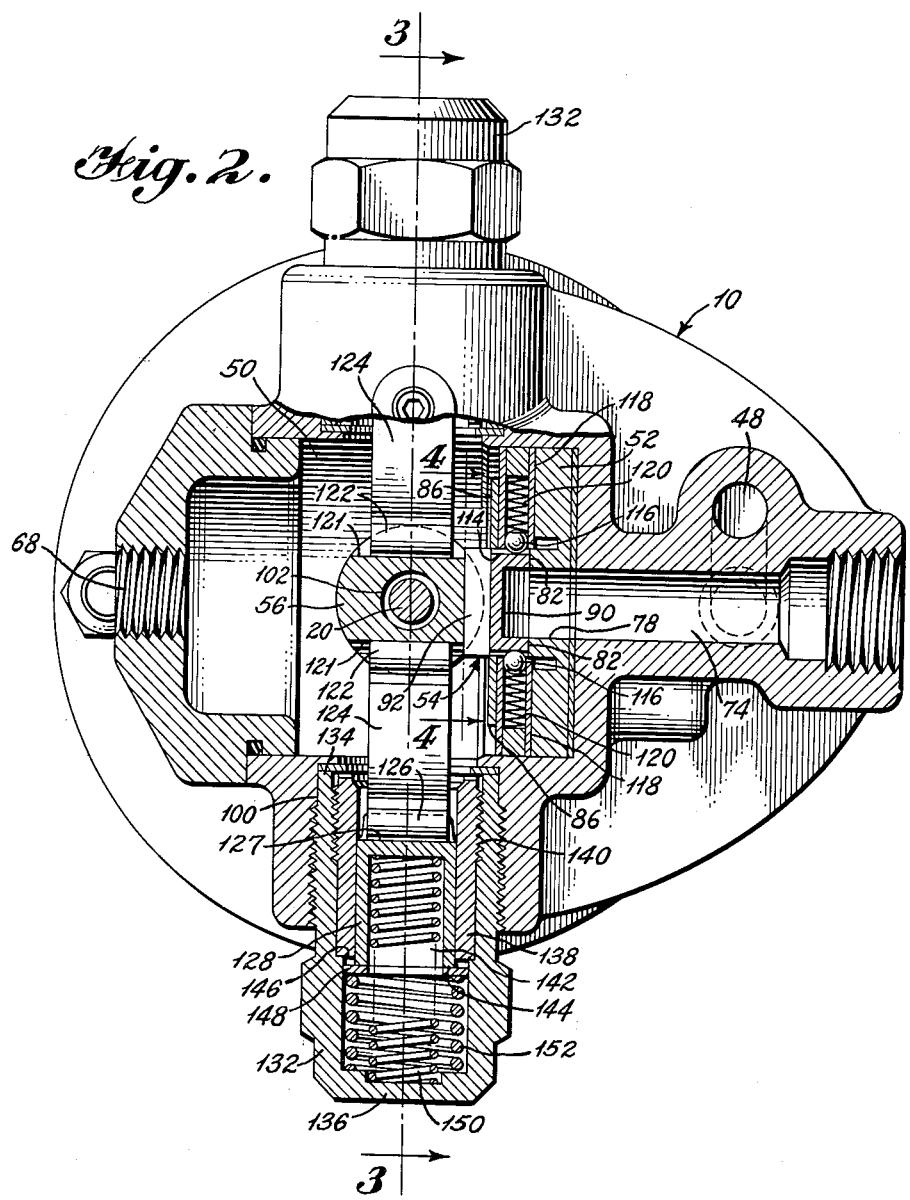

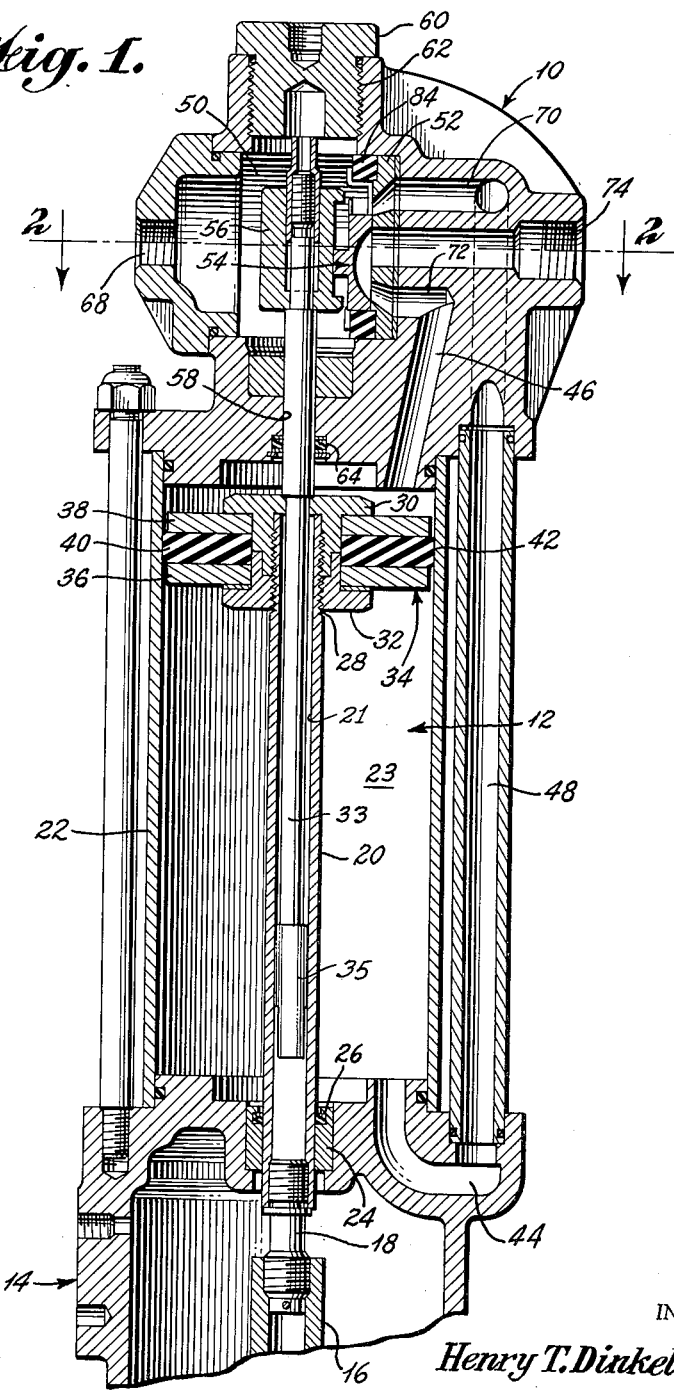

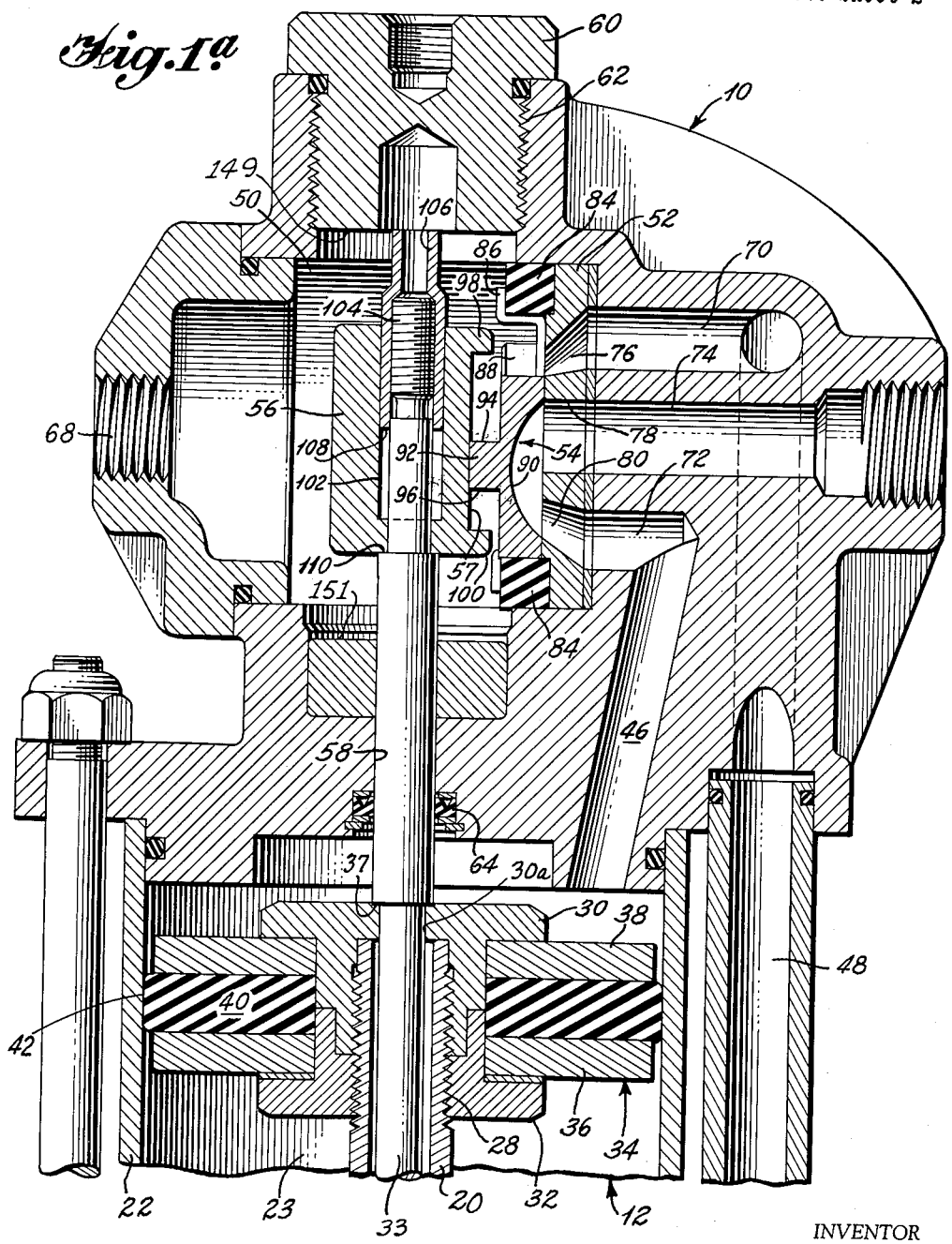
Fig. 1ᵃ
INVENTOR
*Henry T. Dinkelkamp*
BY
*A. G. Douvas*
ATTORNEY

INVENTOR
Henry T. Dinkelkamp
BY
A. G. Douvas
ATTORNEY

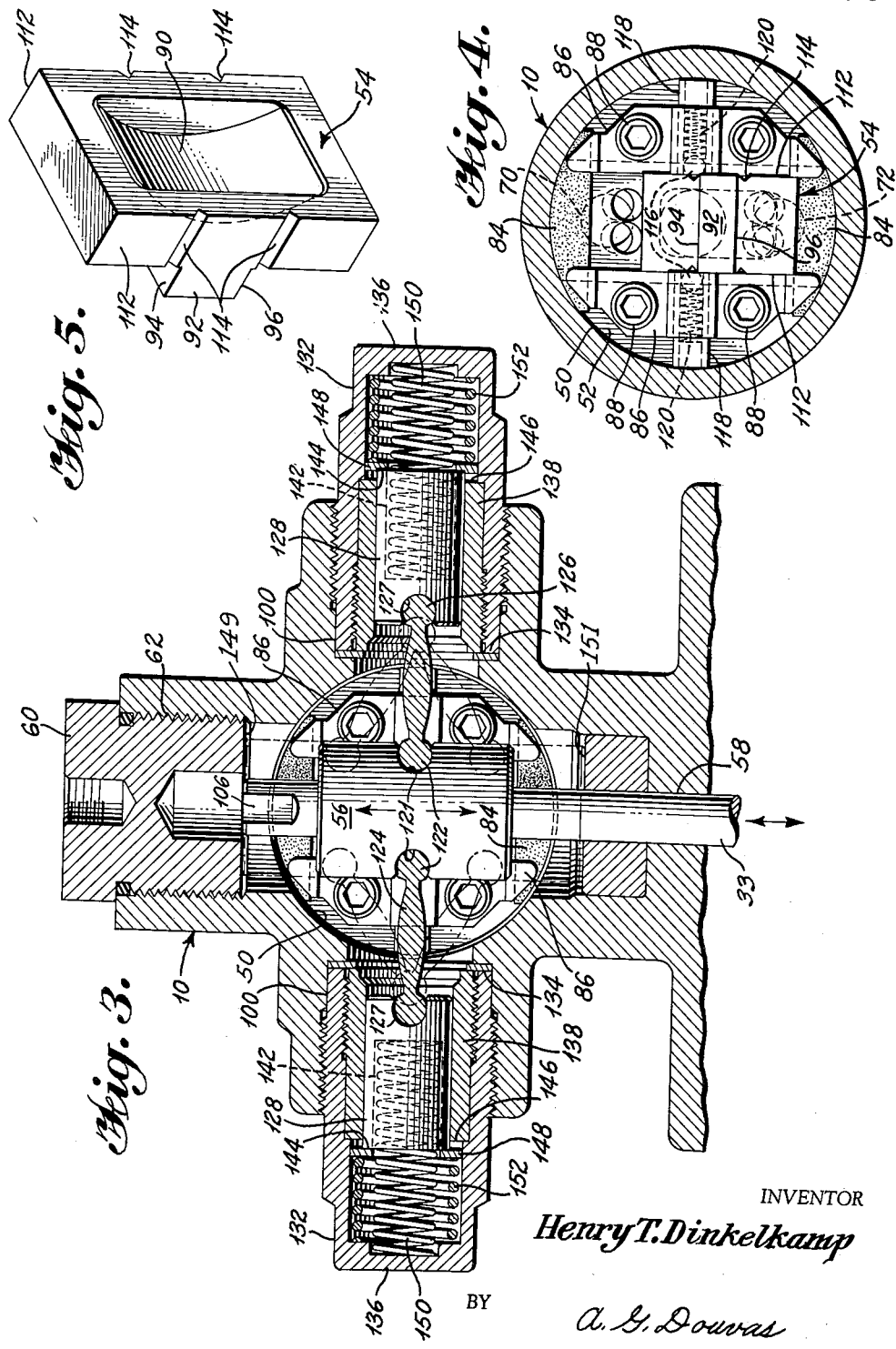

United States Patent Office 3,021,823
Patented Feb. 20, 1962

3,021,823
RECIPROCATING AIR MOTOR
Henry T. Dinkelkamp, Mount Prospect, Ill., assignor to Stewart-Warner Corporation, Chicago, Ill., a corporation of Virginia
Filed Apr. 28, 1959, Ser. No. 809,401
9 Claims. (Cl. 121—164)

This invention relates generally to fluid pressure-operated reciprocating motors of the type shown in my Patent 2,637,304, issued May 5, 1953, such motors being generally used for the operation of grease pumps from a compressed air supply.

The air motor of this patent employs a constantly oscillating valve operator or shuttle arrangement which is adapted to move a D valve between either of two positions to supply the fluid pressure alternately to opposing sides of a reciprocating piston. In order to insure that the valve operator or shuttle assembly will move rapidly to either of the extreme positions, there is employed within the apparatus, an over-center, spring toggle mechanism which urges the valve operator or shuttle away from the neutral position. While this construction has proved to be satisfactory for small to medium size motors, employment of this arrangement with large size fluid motors has resulted in extreme forces being applied and removed from the toggle mechanism and its associated valve operator or shuttle. In some cases, damage to the toggle mechanism has resulted from the extreme pounding occasioned by the application and removal of such large spring forces. It is therefore an object of this invention to provide an improved spring toggle mechanism for the operation of a D valve in a fluid pressure-operated reciprocating motor in which the spring load on the shuttle assembly or valve operator is greatly reduced when the shuttle is at either of its extreme positions.

Since the air motor is constantly reciprocating, during operation, the valve operator or shuttle assembly and the D valve itself are also oscillating within the apparatus at the same frequency at which the piston is moving. Again, in the case of relatively large motor construction, the inertia force set up within the moving element has been increased to a point where the shock loads are so great during the changes in direction of movement that excessive damage to the valve, shuttle and toggle arrangement has resulted.

It is therefore, a further object of this invention to provide an improved pressure-operated reciprocating motor in which the inertia shock load caused by the inertia of the moving shuttle, valve and toggle arrangement is greatly reduced.

Other objects of this invention will be pointed out in the following detailed description and claims and illustrated in the accompanying drawings which disclose, by way of example, the principle of this invention and the best mode which has been contemplated of applying that principle.

In the drawings:
FIGURE 1 is a vertical longitudinal section of a fluid motor employing one embodiment of this invention;
FIGURE 1a is an enlarged view of the top portion of FIGURE 1;
FIGURE 2 is a horizontal transverse section taken along line 2—2 of FIGURE 1;
FIGURE 3 is a fragmentary vertical section taken along line 3—3 of FIGURE 2, showing the improved toggle mechanism;
FIGURE 4 is a vertical section taken along the line 4—4 of FIGURE 2, showing the guide and detent mechanism of the D valve.
FIGURE 5 is a perspective view of the D valve.
Looking now to the drawings, there is shown a fluid pressure-operated, reciprocating motor including three main portions; a D valve supporting and fluid supply portion 10, a reciprocating piston and cylinder assembly portion 12, located immediately below section 10, and a coupling section 14 at the bottom of the unit allowing the motor to be coupled to the end device, in this case a lubricant pump. The unit is so formed that the portion 14 acts as a lubricant-pumping cylinder having a piston actuating rod 16 positioned therein. A self-aligning coupling 18 connects the pump piston rod 16 to the motor piston rod 20 which is adapted to reciprocate within the main air motor cylinder 22. The motor piston rod 20 is hollow forming a bore 21, with the outside of the rod being sealed from the lubricant-pumping cylinder portion 14 by suitable sealing means 24 which includes an O ring or the like 26 immediately adjacent the reciprocating main piston rod 20. A portion of piston rod 20 is threaded at 28 and is adapted to receive a pair of threaded flange members 30 and 32 which are secured in back-to-back relation and rigidly held upon the piston rod 20 in this manner. A free-floating rod 33 extends through an aperture 30a of flange member 30 into the bore 21 of the motor piston rod 20. A nut 35 threaded onto the lower end of rod 33 is free to slide longitudinally within bore 21. The rod 33 is recessed and is free to move axially relative to the flange member 30 through aperture 30a between the nut 35 and shoulder 37. However the abutment of flange member 30 with either nut 35 or shoulder 37 unifies motor rod 20 and floating rod 33 so that if rod 20 continues to move in the same direction as before the abutment, the rods must move as a single unit. The piston 34 includes two spaced, rigid, disc members 36 and 38 which may be of metal having an outside diameter slightly less than the internal diameter of cylinder 22. A resilient disc 40 of rubber or the like having an outside diameter which is slightly in excess of the internal diameter of cylinder 22 is positioned between the disc members 38 and 36 with the outer peripheral surface 42 of the resilient disc 40 forming a seal between the piston assembly 34 and the main cylinder 22. Associated with this cylinder 22 are fluid duct 44 positioned at one end of the cylinder and fluid duct 46 which is located adjacent the upper end of the working chamber 23. A passageway 48 which runs parallel to the working chamber 23 connects the lower fluid duct 44 with the fluid supply located in the upper portion 10 of the apparatus.

The upper D-valve supporting and fluid supply portion of the apparatus 10 may be of cast construction and includes a centrally located, vertical bore or chamber 50 which is adapted to receive valve seat member 52, a reciprocating D-slide valve 54 and a reciprocating valve operator 56. The floating rod 33 extends upwardly through aperture 58 formed within the cast member 10 at the lower end thereof and is adapted to oscillate the valve operator 56 in response to movement of the piston 34. A suitable cap 60 is threadedly engaged at 62 with the upper end of the member 10 and acts as the upper seal for the bore 50. Sealing means such as O ring 64 is employed to insure against fluid passing directly from bore 50 to the working cylinder chamber 23, except by means to be described later. Fluid under pressure is admitted through a horizontal passageway 68 located on one side of the house adjacent bore 50. The fluid therefore surrounds the rod 33 at this point and the valve operator 56, and is directed alternately to the opposite sides of the piston assembly 34, depending upon the position of the D-slide valve 54. As such, the portion of the working chamber 23 beneath the piston assembly 34 is connected to the fluid supply emanating from bore 68 by way of duct 44 and the vertical passageway 48, which is connected to a horizontally extending passageway 70. Likewise, the vertical passageway 46, which allows the pressurized fluid to enter the working chamber 23 on the upper side of piston assembly 34, is connected to a generally parallel, horizontal passageway 72. Intermediate of the two spaced, horizontal passageways 70 and 72 is a third passageway 74 which is adapted to exhaust fluid to the atmosphere. At the inner end of the three passageways, 70, 72 and 74, there is positioned within the cylinder bore 50, the valve seat plate 52 having cooperating ports 76, 78 and 80 formed therein. The port 76 is in communication with passageway 70, the port 80 is in communication with passageway 72, and the port 78 is in communication with the atmosphere through exhaust passageway 74. As best shown in FIGURE 2, the valve seat plate 52 has a raised valve seat surface 82 which may readily be ground or lapped so as to provide a smooth surface for engagement with the D-slide valve 54. The valve seat plate 52 is tightly secured over the openings of the passageways 70, 72 and 74 by means of laterally extending blocks 84 which are secured to the upper housing portion 10 by means of a pair of vertically extending, spaced support members 86, FIGURE 4. The assembly as a whole is held in place by the use of four threaded screw members 88. These supporting members 86 are spaced from each other and form boundaries for the reciprocating D valve 54. The D valve itself includes a central scalloped portion 90 which acts as a channel means to direct the flow of pressurized fluid from either one of the ports 76 and 80 to the central or discharge port 78 formed within the valve seat. On the opposite side of the D valve, there is provided a single, centrally located, protuberance 92 having upper and lower contact surfaces 94 and 96. The contact surfaces 94 and 96 are met by the reciprocating valve operator, and act to move the D-slide valve from one operating position to another adjacent the value seat member 52. In this regard, the valve operator 56 has a cut-away portion 57 along the side adjacent the D-slide valve such that a pair of flanges 98 and 100 are formed at either end. These flanges 98 and 100 cooperate with the contact surfaces 94 and 96 formed on the projecting portion 92 of the D-slide valve and allow the D-slide valve to oscillate in response to reciprocation of the valve operator 56. This feature of the present invention allows for a compact, simplified arrangement in which the moving parts are kept at minimum size, and the inertia of such parts are therefore greatly reduced. The particular configuration of the parts allow both the valve operator and the D valve to be of relatively the same length. The shuttle or valve operator of the prior art structures are normally of a size twice the length of the D-slide valve. It becomes therefore apparent that the present improved structure employs moving parts in which the inertia load is greatly reduced.

In like manner to the apparatus shown in my prior patent, the valve operator 56 includes a central bore 102 which is adapted to receive the upper end of the rod 33. The extreme upper end of the rod 33 is threaded at 104, and an intermediate cylinder 106 is threadably engaged upon the rod at this point and is positioned within bore 102 between the rod 33 and the valve operator 56. As such, a shoulder 108 is formed and in response to movement of the rod 33, the valve operator 56 will slide on the rod between stops 108 and a shoulder 110 formed at the point where rod 33 has its diameter slightly reduced. Thus, while the valve operator 56 is free to move relative to the rod 33, the relative movement is limited. Any further movement of the rod 33 will act to move the D-slide valve from one operating position to the other.

Looking now to FIGURES 2, 4 and 5, another feature of this invention is shown in detail. Since the D-slide valve is a two-position valve, that is, it operates in either of its two extreme positions to allow the high pressure fluid from within the operating chamber 23 to be discharged to the atmosphere through port 78 and passageway 74, it is preferable to provide some means for insuring that the valve will remain in its extreme or operative position except when forced from one operable position to the other by the reciprocating valve operator 56. Such means are additionally needed because there is a certain amount of free movement between the valve operator and the valve itself. As can be seen clearly from FIGURE 1a, the only time the valve operator 56 actually is in a position to move the D-slide valve 54 from one position to the other is when either one of the flanges 98 or 100 is in contact with the contact surfaces 94 and 96 of the D-slide valve. If some means were not provided for keeping the D-slide valve 54 in its uppermost operative position, gravity itself would cause the D-slide valve 54 to fall, unless prevented from doing so by the position of the valve operator 56. The present invention includes positive, reliable, and relatively simple means for insuring that the D valve will remain in its operative positions after once being moved to these positions. The D-slide valve 54 (FIGURE 5) is generally rectangular in shape, including a pair of relatively flat side walls 112. As indicated previously, the side walls 112 slide between support members 86. Each side wall 112 of the D-slide valve 54 includes a pair of transversely extending V slots 114 which are generally parallel to each other and at an angle of 90° with the longitudinal axis of the D valve. Cooperating with these V slots 114 are a pair of detent balls 116 which are positioned in suitable support means 118, the support means 118 being positioned at right angles to the axis of the reciprocating D-slide valve so as to allow the detent balls 116 to be moved toward and away from the side wall 112. Each of the detent balls 116 has, positioned at the outer side thereof, a small helical coil spring 120 which biases the detent balls towards the side walls 112. It is readily apparent, therefore, that as the valve actuator 56 reciprocates and moves the D-slide valve from one operative position to the other, the detent balls 116 will move under the bias of springs 120 into the slots 114 as the D-slide valve moves into its extreme position. As a result, there is provided an extremely simple means for insuring that the D-slide valve will remain in its operative position when once driven there by the valve operator.

In order to secure rapid and reliable shifting of the D-slide valve between its two operative or extreme positions, it is desirable to provide means for causing the valve operator 56 to shift between its two positions with a movement which is extremely rapid during the time that either flange 98 or 100 of the operator is in contact with the projection 92 formed on the D-slide valve 54. The means for accomplishing this snap action is best shown in FIGURES 2 and 3, from which it will be noted that the valve operator 56 is provided with a pair of diametrically opposite chordal grooves 121 which are adapted to receive the cylindrical ends 122 of a pair of toggle links 124. The opposite ends of the toggle links 124 have similar cylindrical ends 126 which bear in semi-cylindrically shaped grooves 127 which extend diametrically across the faces of plungers or pistons 128. In this regard, housing portion 10 includes a pair of generally horizontal bores 100 which are threaded at the outer ends and receive a first elongated cylindrical member 132. The cylindrical member 132 is open at its forward end 134 but has a solid outer end wall 136. Positioned intermediate of the first cylindrical member 132 is a second cylindrical member 138 which is of somewhat lesser length and is rigidly held within the first cylindrical member 132 by means of suitable threads. The inner surface of the second cylindrical member 138 is relatively smooth and is adapted to receive the plunger or piston 128. The piston 128 includes a central, hollowed portion 142 at the end remote from the valve operator so as to form a cylindrical outer or tip portion 144. As indicated previously, the second cylindrical member 138 is of a length less than the length of the first cylinder 132 so as to form a shoulder 146 at a point intermediate the ends of the first cylinder.

The piston 128 is of such a length that when the link 124 has its axis at a position at right angles to the axis of the valve operator 56, the tip portion 144 of piston 128 extends slightly beyond the shoulder 146 formed between the two cylindrical members 138 and 132. A hollow washer 148, having an outer diameter slightly less than the inner diameter of the first cylinder, is positioned within this first cylinder and is freely movable longitudinally of said first cylinder between the shoulder 146 and end wall 136 of this cylindrical member.

The present invention has as one feature means for relieving the biasing pressure exerted against the valve operator 56 as it moves from one extreme position to the other, namely when the operator abuts surface 149 for its uppermost position, or when it abuts surface 151 for its lowermost position. As such, there is provided a first helical coil spring 150 having one end positioned within the bore 142 formed in piston 128 and the other end adapted to contact the end wall 136 of the first cylindrical member. This spring 150 is adapted to bias the piston 128 towards the valve operator 56 regardless of the position of the valve operator. A second helical coil spring 152 is positioned coaxial of the first spring 150 and surrounds this spring. The coil spring 152 also has its outer end in contact with the end wall 136 of cylinder 132, but has its inner end in contact with the adjacent side of the hollow washer 148. When the valve operator 56 moves towards either of its extreme positions, the piston 128 will move inwardly to a point where the hollow washer 148 will contact shoulder 146, thereby taking the biasing spring pressure from coil spring 152 off of piston 128, and the only force which will be exerted against the piston 128 and transferred to the valve operator 56 will be the biasing force of spring 150. Not only will the total biasing force be reduced somewhat by the fact that the biasing spring 150 has expanded, but the force against the valve operator, when it is in either of its extreme positions, will be greatly reduced because the biasing force of spring 152 has been relieved altogether. In addition, the spring constant of spring 152 is somewhat greater than the spring constant of spring 150. Therefore, the total effect will be such that the maximum spring force is exerted against the piston when the link 124 is at right angles to the axis of the valve operator or nearly so, and at all other times the biasing effect will be greatly lessened.

While the operation of the motor is probably apparent from the above description, and is quite similar to the operation of the motor disclosed in my aforementioned patent, a brief description is as follows. With the apparatus having the same general dimensions as indicated by my prior patent, the valve operator 56 will strike its lower limit stop 151 before the D valve 54 strikes the surface of the retaining plate 84, and the D valve will complete its stroke due to its momentum assisted by the action, whereby it will be held in its operating or extreme position by the detent ball 116 which now is resting within slot 114.

When the D-slide valve 54 is in its lower position, air pressure is supplied to the lower end of power cylinder 22, and the piston assembly 34 will commence its upward return stroke until flange member 30 engages shoulder 37 to unify the rods 20 and 33 so that the continued upward stroke of the piston assembly 34 causes shoulder 110 to engage the lower end of valve operator 56, carrying the latter upwardly past the center of its stroke. As the valve operator 56 moves upwardly in response to movement of piston assembly 34, the toggle elements 124 will pivot at 121 and 126 and tend to move to a position exactly at right angles to the valve operator 56. During this movement, biasing spring 150, which constantly exerts a biasing force against the other end of piston 128, will be compressed. At the same time the piston 128 will cause a slight compression of biasing spring 152 just prior to the valve operator 56 moving to its neutral position, since the cylindrical portion 144 of the piston 128 acts to move the hollow washer 148 away from shoulder 146. When the valve operator 56 moves past its neutral position, the toggle link 124 will effect a snap, upward movement of the valve operator 56 with full spring force exerted by both biasing springs 150 and 152 during this initial upward movement from the neutral position. However, as soon as a valve operator 56 moves upwardly a short distance, most of the biasing spring pressure will be relieved, since the biasing spring 152 with the high spring constant will once again seat washer 148 against shoulder 146, effectively removing most of the spring bias. The total effect is to initially snap the valve operator 56 from a neutral to a fully extended upward position, but at the same time removing the spring pressure just prior to the valve operator 56 reaching its fully extended or extreme position by abutment with surface 149. As a result, the valve operator 56 will not be subjected to an extreme shock as it reaches its fully extended position. Just after the valve operator 56 passes its center position, its lower shoulder 100 will contact the bottom surface 96 of projection 92 formed upon the D-slide valve 54 and will act to snap the latter upwardly to its upper operative position, wherein detent ball 116 will now be positioned within the lower of the two parallel elongated V-shaped slots 114, thus securely positioning the D-slide valve in its upper operative position. Again, the upward stroke of the D-slide valve 54 is likewise completed by the momentum of the valve, since there is preferably slight play between the valve operator 56 and the D-slide valve 54 when the D-slide valve and the operator are both in their uppermost positions. By virtue of this slight clearance or play, the D-slide valve is not required to bear the full hammering impact due to the momentum of the operator 56, and the action of the valve is therefore smoother with less noise and wear. With the reduced size of these parts, there will be less inertia shock to the valve and its associated elements.

Upon the D-slide valve 54 being moved to its upper operative position, air pressure is supplied to the upper end of power cylinder 22, and the piston assembly 34 will commence its downward return stroke until flange 30 engages nut 35 to unify the rods 20 and 33 so that the continued downward stroke of the piston assembly causes stop 108 to engage the valve operator 56, carrying the latter downwardly past the center of its stroke whereupon the toggle elements 124 snap the operator in a manner similarly to that described above. Just after the operator passes its center position its upper flange 98 will engage contact surface 94 of the D-slide valve to snap the latter downwardly to its lower operative position wherein detent balls 116 will now be positioned within the upper of the two parallel slots 114 to securely position the D-slide valve in its lower operative position. The valve operator 56 will similarly be positioned in its lowermost position by abutment with surface 151 before the D-slide valve is positioned in its lower operative position, relieving the full hammering impact of the valve operator upon the D-slide valve.

While there is shown and described a preferred embodiment of this invention, it will be apparent that numerous variations and modifications thereof may be made without departing from the underlying principles of the invention. It is therefore desired by the following claims to include within the scope of the invention all such variations and modifications by which substantially the results of this invention may be obtained through the use of substantially the same or equivalent means.

What is claimed is:

1. In a D-slide valve structure for a reciprocating fluid motor including a valve body having three adjacent passageways therein and including an actuator rod reciprocably received in the valve body, a valve seat plate positioned over the ends of the passageways and having three ports respectively in communication with the passageways and aligned in order in the direction of the actuator rod movement, the plate forming a valve seat, a generally rectangular D-slide valve reciprocable over the valve seat and the ports in the direction of the actuator rod movement, a short projection on the valve extending outwardly in a direction away from the valve seat, a pair of aligned transverse grooves formed within each side wall of the valve in longitudinally spaced relation, a solid detent ball positioned adjacent the valve along each side wall and adapted to move toward and away from the side wall, means biasing each ball toward its respective side wall, a valve operator slidably carried by the actuator rod having shoulders adjacent its ends spaced from each other a distance greater than the length of the valve projection and alternately engaging the valve projection to move the valve between one operative position and another operative position whereby each ball rolls alternately from a position within one of its recesses to a position within its other recess, and a spring-biased toggle mechanism pivotally connected to and extending radially from the operator to cause snap action movement of the valve to the operative positions, the mechanism including a toggle link support member movable perpendicularly to the movement of the valve operator, a toggle link pivotally connected at its opposite ends to the support member and valve operator, and a pair of springs engageable with the support member to urge it towards the valve operator, one of the springs continuously engaging the support member throughout its movement while the other of the springs engages the support member only when the toggle mechanism is in close proximity to its neutral position.

2. In a D-slide valve structure including a reciprocating piston rod having spaced stops, a valve seat member, a D-slide valve reciprocable over the valve seat member, means for limiting movement of said D-slide valve between two extreme positions, a valve operator slidable relative to the piston rod between the stops thereof, a quick snap-over mechanism connected to said operator comprising: toggle link supporting means positioned adjacent said valve operator and adapted to slide toward and away from said valve operator at right angles thereto, a toggle link connecting said supporting means and said valve operator and mounted for pivotable movement within said elements, coaxial springs exerting a biasing force on said toggle support means tending to move said toggle support means toward said operator, and means for substantially reducing said biasing force when said valve operator is at substantially either of its extreme positions.

3. In a valve mechanism for a fluid pressure-operated motor including a valve seat member, a two-position D-slide valve reciprocable over the valve seat, a valve operator slidable relative to said valve and adapted to oscillate said valve between two operative positions, a quick snap-over mechanism connected to said valve operator comprising: a frame, a toggle link support member guided by the frame to move toward and away from said valve operator at right angles thereto, a toggle link pivotally connecting said valve operator and said toggle link supporting member, first and second coaxial helical coil springs carried by the frame to urge the support member toward the valve operator, the first coil spring engaging the supprt member throughout the movement of the valve operator, an abutment member engaging the second coil spring and held thereby against the frame and disposed so that the support member will engage the abutment member and act against the second coil spring only when the snap-over mechanism is in close proximity to the neutral position.

4. In a valve mechanism for a fluid pressure operated motor including a valve seat, a two-position D-slide valve mounted adjacent said valve seat and adapted to reciprocate over said valve seat, a valve operator mounted for oscillation between either of two extreme positions and adapted to move said valve from a first to a second operative position, a quick, snapover mechanism connected to said valve operator comprising: toggle link supporting means positioned adjacent said valve operator at a point intermediate of its two extreme positions, said toggle link supporting means adapted to slide toward and away from said valve operator at right angles thereto, a toggle link pivotally connecting said toggle link supporting means with said valve operator, a spring engaging and tending to move said toggle link supporting means toward said valve operator regardless of the position of said valve operator, and an auxiliary booster spring engaging and tending to bias said toggle link supporting means toward said valve operator only when said valve operator is at a point substantially intermediate of its two extreme positions.

5. In a D-slide valve structure including a stationary valve seat, a reciprocating D-slide valve adapted to be moved between two operative positions and a valve operator slidably mounted within said structure and adapted to move said valve between said two positions, a quick snap-over mechanism connected to said operator comprising: toggle link supporting means positioned adjacent said valve operator intermediate the two extreme positions of said valve operator and adapted to slide toward and away from said valve operator at right angles thereto, a toggle link pivotably mounted on said valve operator at the center thereof, and attached to one end of said toggle link supporting means, a first coil spring positioned adjacent the other end of said toggle link supporting means and adapted to exert a biasing force against said toggle link supporting means throughout the reciprocatory movement of said valve operator, and a second helical coil spring mounted coaxially of said first helical coil spring and adapted to exert a biasing force against said toggle link supporting means only when said valve operator is at a point intermediate of its extreme positions.

6. In a D-slide valve structure including a stationary valve seat, a reciprocating D-slide valve adapted to be moved between two operative positions and a valve operator slidably mounted within said structure and adapted to move said valve between said two positions, a quick snap-over mechanism connected to said valve operator comprising: a bore formed at right angles to the axis of said oscillating valve operator, a first cylinder positioned within said bore, a second cylinder concentric with the first cylinder, said second cylinder being somewhat shorter than said first cylinder and positioned inside said first cylinder, at the inner end thereof, to form a stop shoulder intermediate the ends of said first cylinder, a piston mounted within said second cylinder and adapted to reciprocate therein, said piston being of a length less than said second cylinder, a hollow washer positioned adjacent said piston within said bore and adapted to reciprocate only within said first cylinder toward said stop shoulder, a toggle link pivotably connected to said piston at the inner end thereof and the outer peripheral surface of said valve operator, a first helical coil spring contacting the outer surface of said piston and exerting a biasing force against said piston, a second helical coil positioned coaxial of said first helical coil and contacting said washer, said second coil biasing said washer toward said stop shoulder whereby said first biasing coil exerts a biasing force against said piston throughout the movement of said valve operator, but said second helical coil exerts a biasing force against said piston only when said valve operator is approximately intermediate of its extreme positions.

7. A quick throw toggle mechanism comprising a support structure, a reciprocable member guided by the support structure along a first path between two extreme positions, a toggle link support member guided by the support structure along a second path disposed intermediate the extreme positions of the reciprocable member, a toggle link pivotally connected to the support member and the reciprocable member so that movement of the reciprocable member along the first path predetermines movement of the support member along the second path, with the toggle link being perpendicular to the first path when the reciprocable member is at some point intermediate its extreme position, a pair of coaxial springs supported by the structure for urging the support member along the second path toward the first path, one of the springs being in constant engagement with the support member so that it continuously urges the support member toward the first path, the other of the springs being in engagement with the support member only when the toggle link is approximately perpendicular to the first path to act as a booster force to urge the support member toward the first path only when the toggle mechanism is in close proximity of its neutral position.

8. In a quick snap-over mechanism for valve assembly having a valve moved between two operative positions by a reciprocable valve operator, comprising structure disposed intermediate the extreme positions of the valve operator, a toggle link support member guided by the structure to slide along a path disposed substantially at right angles to the movement of the valve operator, a toggle link pivotally connected at its ends to the valve operator and support member, and a pair of compression springs carried by the structure to urge the support member toward the valve operator, one of the springs being in continuous engagement with the support member for continuous actuation thereof for all positions of the valve operator, the other of the springs being in engagement with the support member only when the snap-over mechanism is in close proximity of its neutral position to act as a booster spring to snap the support member toward its extreme positions.

9. In a fluid motor having a piston disposed in a closed end cylinder, an improved slide valve arrangement for reversing fluid flow to the chambers on opposite sides of the piston to reciprocate the piston, comprising a valve seat plate having spaced ports therein communicating respectively with the opposite chambers, a valve operator guided for movement adjacent the valve seat plate in a direction generally in line with the space ports, a valve member seated on the valve seat plate and movable thereon in a direction generally in line with the spaced ports to selected control positions respectively, operable to communicate separately with the ports, said valve member having a generally rectangular transverse cross-section, with one set of opposed sides matably engaging respectively the valve seat plate and valve operator, opposed detent members resiliently engaging the other set of opposed sides to hold the valve member in its control positions and resiliently releasing the valve member upon sufficient actuation thereof, means for moving the valve operator responsive to movement of the piston, and means including spaced projections on the valve operator abuttable with the valve member to actuate the latter to its control positions.

References Cited in the file of this patent

UNITED STATES PATENTS

| | | |
|---|---|---|
| 126,623 | Chandler | May 14, 1872 |
| 375,200 | Ross | Dec. 20, 1887 |
| 1,017,388 | Dickson | Feb. 13, 1912 |
| 1,965,038 | Hartman | July 3, 1934 |
| 2,637,304 | Dinkelkamp | May 5, 1953 |
| 2,804,055 | Hill et al. | Aug. 27, 1957 |